No. 857,928. PATENTED JUNE 25, 1907.
J. DUGDILL.
FITTING FOR ELECTRIC LAMPS.
APPLICATION FILED NOV. 3, 1906.
2 SHEETS—SHEET 1.
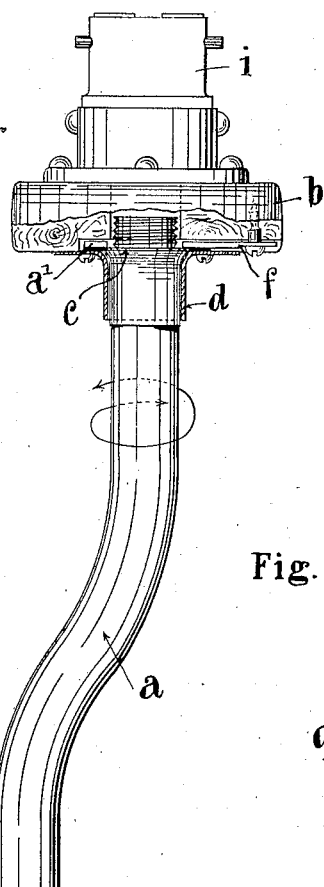
Fig. 1.
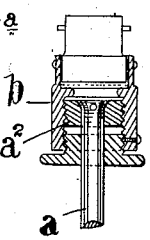
Fig. 2ª
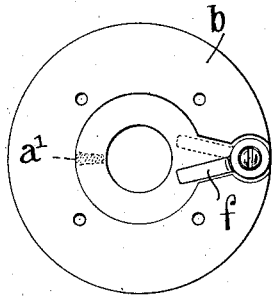
Fig. 2
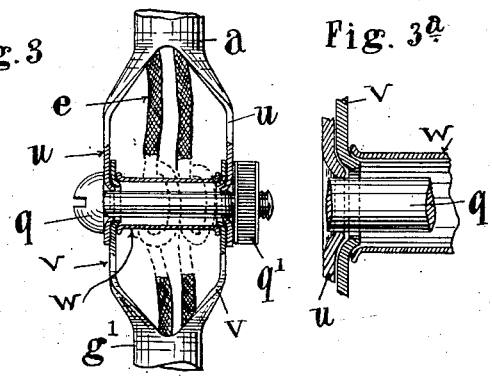
Fig. 3   Fig. 3ª
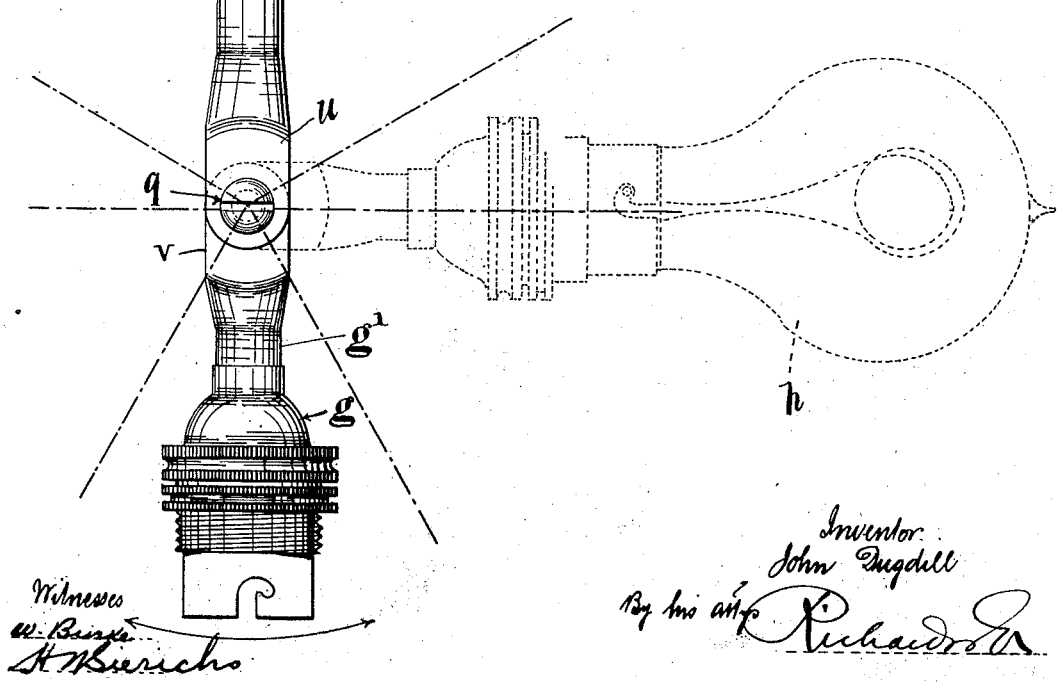
Witnesses
Inventor
John Dugdill No. 857,928. PATENTED JUNE 25, 1907.
J. DUGDILL.
FITTING FOR ELECTRIC LAMPS.
APPLICATION FILED NOV. 3, 1906.
2 SHEETS—SHEET 2.
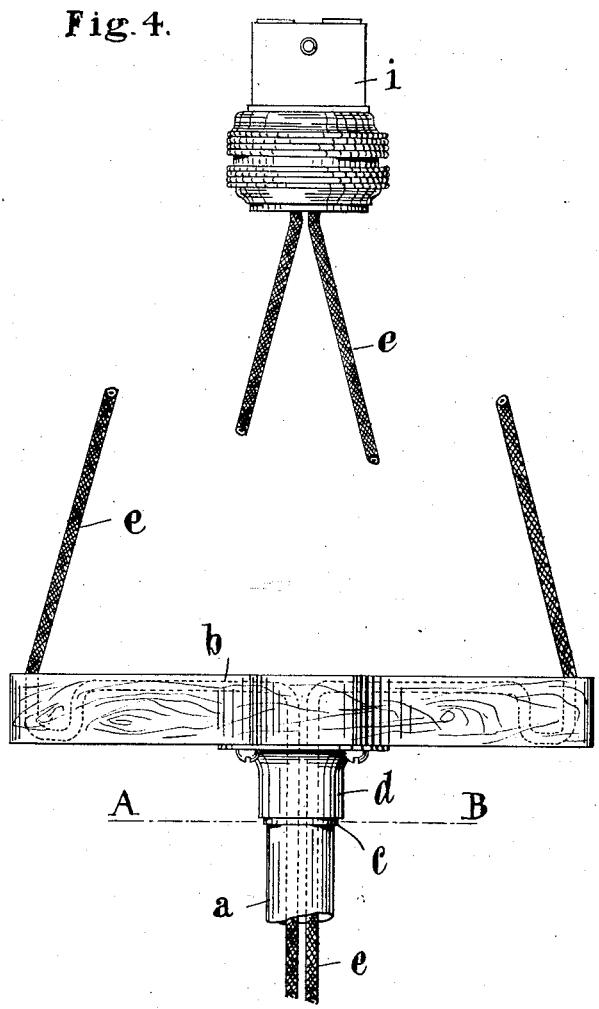
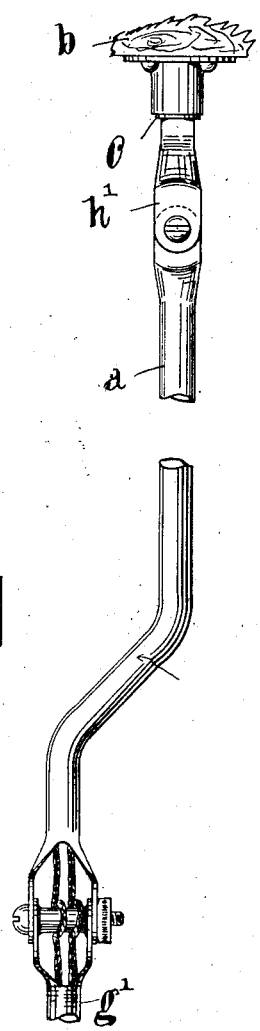
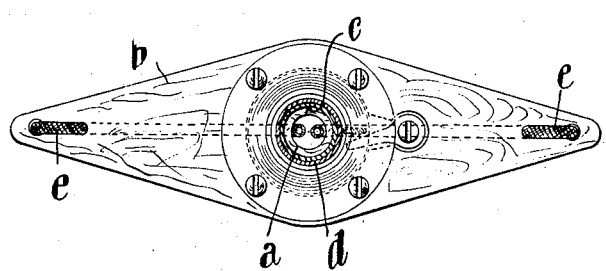

UNITED STATES PATENT OFFICE.

JOHN DUGDILL, OF FAILSWORTH, NEAR MANCHESTER, ENGLAND.

FITTING FOR ELECTRIC LAMPS.

No. 857,928.  Specification of Letters Patent.  Patented June 25, 1907.

Application filed November 3, 1906. Serial No. 341,850.

*To all whom it may concern:*

Be it known that I, JOHN DUGDILL, a subject of Great Britain, residing at 305 Oldham road, Failsworth, near Manchester, in the county of Lancaster, England, electrical engineer, have invented new and useful Improvements in Fittings for Electric Lamps, of which the following is a specification.

My invention relates to electric fittings of the type having joints whereby the lamp can be set at varying angles, and means for rotating the lamp around an axis. In such fittings I employ a novel type of knuckle joint which will give the maximum amount of friction between the forks of the joint and a minimum amount of friction on the axis thereof, so that the joint will not be liable to wear slack, and also novel means whereby the lamp may be rotated.

The accompanying drawings show various types of electric fittings provided with my improved rotatable means and joint.

Figure 1 shows in elevation my invention applied to a very convenient type of electric fitting. Fig. 2 is a plan view of part of Fig. 1. Fig. 2$^a$ is a modification of the rotatable means. Fig. 3 is a view, partly in section, of a detail part showing the improved knuckle joint. Fig. 3$^a$ is a portion of Fig. 3 on an enlarged scale. Fig. 4 shows in elevation a modification of electric fitting having the rotatable joint to which the knuckle joint may be applied. Fig. 5 is an underside plan view of Fig. 4 on the line A—B. Fig. 6 is a further modification showing the rotatable means and knuckle joint.

In constructing the electric fitting to form the improved knuckle joint I slit the end of a tube or part $a$ and open it out to provide a fork $u$. Another tube or part $g'$ is similarly dealt with to produce a fork $v$ and the two forked ends $u$, $v$ are placed one within the other and a hole pierced through them. A tubular distance piece or sleeve $w$ is disposed between the bored arms and a bolt $q$ inserted through the arms and the sleeve, and by means of a nut $q'$ the joint is completed. The holes through the sleeves $w$ and the inner arms $v$ are larger in diameter than the bolt $q$ to avoid friction between these parts and the bolt, and the margins of all the holes in the forked ends are dished inward in order better to center each within the other, and to provide a conical friction surface in addition to the plane friction surface between the two forks as indicated in the enlarged view Fig. 3$^a$. The dishing of the holes is not essential but is preferable. In this manner I obtain a good constant friction joint without any tendency for the joint to work slack, and further provide a free open way for the conductors to reduce chafing. This novel construction of knuckle joint gives a maximum amount of friction between the forks of the joint and a minimum of friction on the axis of the joint, besides leaving ample space for the passage of the wires inclosed in the tubes of the fitting.

To provide the rotatable part of the fitting as shown in a detachable electric lamp illustrated in Figs. 1 to 3$^a$ the tube or arm $a$, of convenient length, is connected to a disk or part $b$, which I will hereafter term the tube carrier, by a joint by means of which the tube or arm is capable of being rotated on its axis in either direction as shown by the arrow Fig. 1. The joint is formed by means of a flange or collar $c$ on the tube, rotatable in a bearing $d$ attached to the tube carrier $b$. The conducting wires $e$ are led through the tube carrier $b$, and to prevent the wires from being injured by persistent rotation in any one direction I may provide means to limit the extent of rotation of the tube $a$ to a complete revolution in either direction, although these means may be dispensed with if desired. Such means conveniently consist of a projection or stud $a'$ on the flange $c$ of the rotatable tube $a$ adapted to come into contact with a finger $f$ pivoted to the tube carrier $b$. This finger may have sufficient freedom of movement to enable the tube to be rotated on its axis a complete 360 degrees in either direction of rotation. The arrangement will be better comprehended from an inspection of Fig. 2 which is an underside plan view of the tube carrier $b$, the stud $a'$ carried by the collar $c$ on the tube $a$ being shown in dotted lines. Fig. 2$^a$ shows how the same effect may be obtained by attaching the tube or arm $a$ to a screwed head $a^2$ which can be rotated a complete revolution either way in the internally screwed tube carrier $b$. I do not claim it to be novel *per se* in electric fittings to provide means for rotating the lamp around a central axis and to set the lamp at varying angles. The lower end of the tube or arm $a$ is attached by the improved knuckle joint to the lamp holder $g$ which lamp holder, including the attached member $g'$ of the knuckle joint, is much shorter in length than the tube $a$. The lamp $h$, shown dotted in Fig. 1, may not only be rotated about the axis of the tube $a$ but may also be fixed at varying angles by means of the improved knuckle joint.

The tube carrier $b$ is provided with a plug connector $i$ such as is commonly used for portable lamps, so that it may be connected at once with existing lamp fittings. In Figs. 4 and 5 the tube carrier $b$ provided with the rotatable joint $c$ is shown as embodying one form of cord grip, although other forms of cord grip could be employed, and is suspended directly from conducting wires such as $e$, the wires $e$ being secured to the plug connector or other fitting.

In Fig. 6 the tube is shown as provided, in addition to the rotatable joint $c$, with an additional knuckle joint $h'$ of the improved type so that the tube $a$ may not only be rotated on its axis but may be set to varying angles.

I declare that what I claim is:—

In electric fittings the improved knuckle joint consisting of overlapping outer forks $u$ and inner forks $v$ having holes bored therein dished inward to form conical friction surfaces, a tubular sleeve located between the members of the inner fork, a bolt inserted through the holes in the forks and the sleeve smaller in diameter than the sleeve and the holes in the inner forks, and a nut on such bolt substantially as described.

In testimony whereof I have signed my name to this specification in the presence of two subscribing witnesses.

JOHN DUGDILL.

Witnesses:
  JOSHUA ENTWISLE,
  ALFRED YATES.